(12) United States Patent
Oh et al.

(10) Patent No.: US 9,231,807 B2
(45) Date of Patent: Jan. 5, 2016

(54) TRANSMITTING APPARATUS, RECEIVING APPARATUS AND CONTROL METHODS THEREOF

(71) Applicant: SAMSUNG ELECTRONICS CO., LTD., Suwon-si (KR)

(72) Inventors: Young-ho Oh, Suwon-si (KR); Hyun-koo Yang, Seoul (KR); Hak-ju Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/483,404

(22) Filed: Sep. 11, 2014

(65) Prior Publication Data

US 2015/0071373 A1    Mar. 12, 2015

Related U.S. Application Data

(60) Provisional application No. 61/876,357, filed on Sep. 11, 2013.

(30) Foreign Application Priority Data

May 8, 2014    (KR) .................. 10-2014-0054755

(51) Int. Cl.
   *H04L 27/26*    (2006.01)
(52) U.S. Cl.
   CPC ........ *H04L 27/2627* (2013.01); *H04L 27/2605* (2013.01); *H04L 27/2649* (2013.01)
(58) Field of Classification Search
   CPC ............ H04L 27/2627; H04L 27/2605; H04L 27/2649; H04L 5/0053; H04L 1/0041; H04L 1/0071; H04L 27/2601; H04L 27/2613; H04L 5/0044; H04L 27/2647; H04L 5/0048; H04L 12/18; H04L 1/0013; H04L 1/004
   See application file for complete search history.

(56) References Cited

U.S. PATENT DOCUMENTS

| | | | |
|---|---|---|---|
| 8,514,765 B1 * | 8/2013 | Senarath | H04L 27/2656 370/315 |
| 2009/0213853 A1 * | 8/2009 | Kwon | H04H 20/93 370/389 |

(Continued)

FOREIGN PATENT DOCUMENTS

| | | |
|---|---|---|
| EP | 2200206 A2 | 6/2010 |
| EP | 2571186 A2 | 3/2013 |

(Continued)

OTHER PUBLICATIONS

International Search Report for PCT/KR2014/008381 dated Dec. 18, 2014 [PCT/ISA/210].

(Continued)

*Primary Examiner* — Hirdepal Singh
(74) *Attorney, Agent, or Firm* — Sughrue Mion, PLLC

(57) ABSTRACT

A transmitting apparatus, a receiving apparatus and a method of controlling these apparatus are provided. The transmitting apparatus includes: a frame generator configured to generate a plurality of frames which include one or more kinds of data; a preamble symbol inserter configured to insert at least one preamble symbol in each of the plurality of frames, and insert, in a preamble symbol of a frame, location information about at least one frame, among the plurality of frames, which includes a same kind of data as a kind of data included in the frame; and a transmitter configured to transmit the plurality of frames in each of which the preamble symbol is inserted.

16 Claims, 16 Drawing Sheets

(56) References Cited

U.S. PATENT DOCUMENTS

| | | | |
|---|---|---|---|
| 2010/0202390 A1* | 8/2010 | Lim et al. | 370/329 |
| 2011/0044271 A1* | 2/2011 | Hong et al. | 370/329 |
| 2011/0299468 A1* | 12/2011 | Van Nee et al. | 370/328 |
| 2012/0151547 A1* | 6/2012 | Mourad et al. | 725/116 |
| 2012/0257586 A1* | 10/2012 | Mourad et al. | 370/329 |
| 2012/0327955 A1* | 12/2012 | Herrmann | H04N 21/235 370/476 |
| 2014/0247768 A1* | 9/2014 | Gutierrez et al. | 370/312 |
| 2015/0010096 A1* | 1/2015 | Kim et al. | 375/260 |
| 2015/0043672 A1* | 2/2015 | Kim et al. | 375/267 |

FOREIGN PATENT DOCUMENTS

| | | |
|---|---|---|
| WO | 2011/096759 A2 | 8/2011 |
| WO | 2011/105773 A2 | 9/2011 |

OTHER PUBLICATIONS

Written Opinion for PCT/KR2014/008381 dated Dec. 18, 2014 [PCT/ISA/237].

* cited by examiner

FIG. 7

| Syntax | No. of Bits |
|---|---|
| INPUT_BBP_MODE | 2 |
| FRAME_PROTOCOL_VERSION | 6 |
| FRAME_MODE | 3 |
| ANTENNA_CONFIGURATION | 3 |
| FFT_SIZE | 2 |
| GUARD_INTERVAL | 4 |
| PAPR_FLAG | 1 |
| PILOT_PATTERN | 4 |
| NUM_FRAMES_PER_SUPERFRAME | 8 |
| NUM_DATA_SYMBOLS | 6 |
| TYPE_2_PLP_FLAG | 1 |
| FEF_MIXED_FLAG | 1 |
| NUM_RF_CH_BUNDLED | 3 |
| L1_MOD | 4 |
| L1_COD | 2 |
| L1_FEC_TYPE | 2 |
| L1_POST_INFO_SIZE | 15 |
| L1_ADDITIONAL_PARITY_FLAG | 1 |
| L1_REPETITION_FLAG | 1 |
| TX_ID_AVAILABILITY | 8 |
| CELL_ID | 16 |
| NETWORK_ID | 16 |
| ATSC_SYSTEM_ID | 16 |
| REGENERATION_FLAG | 3 |
| RESERVED | 8 |
| CRC_32 | 32 |

FIG. 8

| Syntax | No. of Bits | Note* |
|---|---|---|
| NUM_PLP | 8 | |
| 810— TARGET_DEVICE | 3 | |
| 820— NEXT_FRAME_INTERVAL | 8 | |
| 830— NEXT_FRAME_LENGTH | 24 | |
| if FEF_MIXED_FLAG == '1' { | | |
|   FEF_TYPE | 4 | |
|   FEF_LENGTH | 24 | |
|   FEF_INTERVAL | 8 | |
| } | | |
| for i=0 .. NUM_RF_CH_BUNDLED { | | |
|   RF_INDEX | 3 | |
|   BUNDLED_FREQUENCY | 10 | in MHz |
| } | | |
| L1_CHANGE_COUNTER | 8 | |
| EWS_COUNTER | 8 | Indicates when EWS comes in a superframe (See below) |
| for i=0 .. NUM_PLP { | | |
|   PLP_ID | 8 | |
|   PLP_TYPE | 2 | Type 1 or Type 2 |
| if INPUT_TYPE == '11' { | | |
|   PLP_BBP_MODE | 2 | See below) |
| } | | |
| PLP_EWS_PAYLOAD | 1 | Indicates whether associated PLP contains EWS data (See below) |
|   PLP_GROUP_ID | 8 | |
|   PLP_BUNDLED_FLAG | 1 | |
|   PLP_ISSYI | 1 | ISSY indicator in PLP-loop |
| if ISSYI == '1' { | | |
|     PLP_ISSY | 42 | contains TTO, BUFS |
| } | | |
|   PLP_MOD | 4 | |
|   PLP_COD | 4 | |
|   PLP_FEC_TYPE | 2 | |
|   PLP_NUM_BLOCKS_MAX | 10 | |
| (Time interleaver parameters; TBD) | | |
|   IN_BAND_FLAG | 1 | When in-band signaling applied |
|   BBF_FEC_FLAG | 1 | |
| } | | |
| RESERVED | TBD | |

TRANSMITTING APPARATUS, RECEIVING APPARATUS AND CONTROL METHODS THEREOF

CROSS-REFERENCE TO RELATED APPLICATION(S)

This application claims priority from U.S. Provisional Patent Application No. 61/876,357, filed on Sep. 11, 2013, in the U.S. Patent and Trademark Office, and priority from Korean Patent Application No. 10-2014-0054755, filed on May 8, 2014, in the Korean Intellectual Property Office, the disclosures of which are incorporated herein in their entirety by reference.

BACKGROUND

1. Field

Apparatuses and methods consistent with exemplary embodiments relate to a transmitting apparatus, receiving apparatus, and control methods thereof, and more particularly, a transmitting apparatus and a receiving apparatus which uses an orthogonal frequency division multiplexing (OFDM) method, and control methods thereof.

2. Description of the Related Art

In recent years, broadcasting communication service tends to be multifunctional and high quality, and use a broadband. With development of electronic technology, not only high-definition (HD) digital televisions (TVs) but also portable broadcasting apparatuses such as high-end smart phones have been increasingly spread, and thus, demands on various broadcasting receiving methods or supports for these services have grown.

As one example to meet the demands, broadcasting communication standards such as digital video broadcasting the second generation European terrestrial (DVB-T2) have been developed. DVB-T2 is the second generation terrestrial digital broadcasting standard which has been currently employed in 35 countries or more in the whole world including Europe. DVB-T2 realizes increase in transmission capacity and high bandwidth efficiency by applying the latest technology such as a low density parity check (LDPC) coding method, a 256 quadrature amplitude modulation (QAM) method, and the like, and thus DVB-T2 may provide various services of high quality even in a fringe area where reception of broadcasting services are very limited.

For broadcasting, a stream including various kinds of data may be transmitted. For example, a transmitter may transmit a stream including data which supports a fixed terminal or data which supports a mobile terminal. Accordingly, a receiving apparatus is required to process only those data that can be processed and supported at the receiving apparatus. Also, the transmitter is required to include information regarding the data which the receiving apparatus is able to process and support in the stream and then, transmit the stream.

SUMMARY

One or more exemplary embodiments address at least the above problems and provide a transmitting apparatus and a receiving apparatus using a preamble symbol including information regarding a location of a frame, and methods thereof.

A transmitting apparatus according to an aspect of an exemplary embodiment may include: a frame generator configured to generate a plurality of frames which include one or more kinds of data; a preamble symbol inserter configured to insert at least one preamble symbol in each of the plurality of frames, and insert, in a preamble symbol of a frame, location information about at least one frame, among the plurality of frames, which includes a same kind of data as a kind of data included in the frame; and a transmitter configured to transmit the plurality of frames in each of which the preamble symbol is inserted.

Here, the location information may include at least one of number information and length information about at least one frame which exists between the frame and another frame separated from the frame by the shortest distance among a plurality of subsequent frames, subsequent to the frame, in which the same kind of data is included.

The one or more kinds of the data may include at least one of a first kind of data for a fixed terminal and a second kind of data for a mobile terminal.

The preamble symbol may include an indicator field which indicates whether the data included in the frame is for a fixed terminal or a mobile terminal.

A receiving apparatus according to an aspect of another exemplary embodiment may include: a receiver configured to receive a plurality of frames in each of which at least one preamble symbol is inserted and one or more kinds of data are included; a signaling processor configured to detect, from a preamble symbol of a frame, location information about at least one frame, among the plurality of frames, which includes a same kind of data as a kind of data included in the frame; and a signal processor configured to selectively process the frame and the at least one frame which includes the same kind of data, based on the location information.

Here, the location information may include at least one of number information and length information about at least one frame which exists between the frame and another frame separated from the frame by the shortest distance among a plurality of subsequent frames, subsequent to the frame, in which the same kind of data is included.

The signal processor may calculate a time corresponding to the shortest distance based on the at least one of the number information and the length information.

The signal processor may maintain a stand-by state during the calculated time, and operate in a normal state when the other frame separated from the frame by the shortest distance is processed after the calculated time elapses.

Here, the one or more kinds of the data may include at least one of a first kind of data for a fixed terminal and a second kind of data for a mobile terminal.

A preamble symbol inserted in the other frame may include an indicator filter which indicates whether data included in the frame is for a fixed terminal or a mobile terminal.

A controlling method of a transmitting apparatus according to an aspect of still another exemplary embodiment may include: generating a plurality of frames which include one or more kinds of data; inserting at least one preamble symbol in each of the plurality of frames; inserting, in a preamble symbol of a frame, location information about at least one frame, among the plurality of frames, which includes a same kind of data as a kind of data included in the frame; and transmitting the plurality of frames in each of which the preamble symbol is inserted.

Here, the location information may include at least one of number information and length information about at least one frame which exists between the frame and another frame separated from the frame by the shortest distance among a plurality of subsequent frames, subsequent to the frame, in which the same kind of data is included.

The one or more kinds of the data may include at least one of a first kind of data for a fixed terminal and a second kind of data for a mobile terminal.

The preamble symbol may include an indicator field which indicates whether the data included in the frame is for a fixed terminal or a mobile terminal.

A controlling method of a receiving apparatus according to an aspect of still another exemplary embodiment may include: receiving a plurality of frames in each of which a preamble symbol is inserted and one or more kinds of data are included; detecting, from a preamble symbol of a frame, location information about at least one frame, among the plurality of frames, which includes a same kind of data as a kind of data included in the frame; and selectively processing the frame and the at least one frame which includes the same kind of data, based on the location information.

The location information may include at least one of number information and length information about at least one frame which exists between the frame and another frame separated from the frame by the shortest distance among a plurality of subsequent frames, subsequent to the frame, in which the same kind of data is included.

The selective processing may calculates a time corresponding to the shortest distance based on the at least one of the number information and the length information.

The selective processing may maintain the receiving apparatus in a stand-by state during the calculated time, and operate the receiving apparatus in a normal state when the other frame separated from the frame by the shortest distance is processed after the calculated time elapses The one or more kinds of the data may include at least one of a first kind of data for a fixed terminal and a second kind of data for a mobile terminal.

A preamble symbol inserted in the other frame may include an indicator field which indicates whether data included in the other frame is for a fixed terminal or a mobile terminal.

According to various aspects of exemplary embodiments, the power consumption may be reduced by processing only frames including an same kind of data.

BRIEF DESCRIPTION OF THE DRAWINGS

FIG. 7 is a view illustrating a field which is included in L1 pre-signaling, according to an exemplary embodiment;

FIG. 8 is a view illustrating a field which is included in L1 post-signaling and indicates L1 post-signaling, according to an exemplary embodiment;

DETAILED DESCRIPTION OF THE EXEMPLARY EMBODIMENTS

Hereinafter, exemplary embodiments will be described in greater detail with reference to the accompanying drawings. In explaining the exemplary embodiments, if it seems that a detailed explanation regarding a related art or configuration obscures a substance of the inventive concept with an unnecessary detail, the detailed explanation is omitted. Terms used below are justified in accordance with a function of the exemplary embodiments, and these may change according to an intention of a user and an operator, and customs. Therefore, the justification should be made through the overall specification of the present application.

Figure 1:
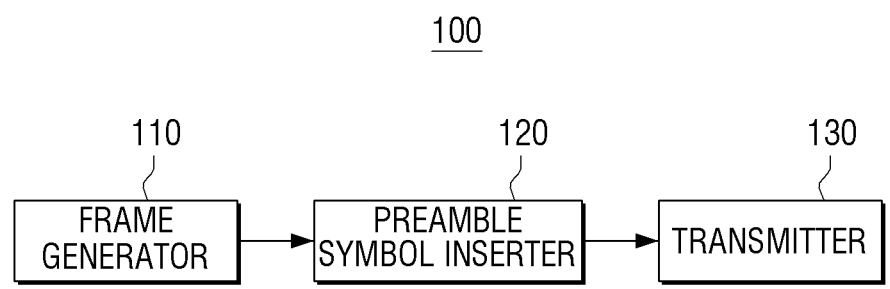
FIG. 1 is a block diagram illustrating a configuration of a transmitting apparatus, according to an exemplary embodiment.

FIG. 1 is a block diagram illustrating a configuration of a transmitting apparatus 100 according to an exemplary embodiment.

As illustrated in FIG. 1, a transmitting apparatus 100 includes a frame generator 110, a preamble symbol inserter 120, and a transmitter 130.

The frame generator 110 may generate a plurality of frames where data to be transmitted is inserted. The frame generator 110 may generate a plurality of frames where one or more kinds of data are inserted. As an example, a DVB system adopts a physical layer pipe (PLP) concept to provide a variety of broadcasting services having different modulation methods, different channel coding rates, different time and cell interleaving lengths, or the like to one broadcasting channel.

The PLP means a signal path independently processed. That is, a variety of services (for example, video, extended video, audio, a data stream, or the like) may be transmitted/received through a plurality of radio frequency (RF) channels, and the PLP is a path through which the service is transmitted or a stream which is transmitted through the path. Further, the PLP may be located in slots distributed at time intervals on the plurality of RF channels, or the PLP may be distributed on one RF channel at time intervals. That is, the PLP may be distributed on the one RF channel or the plurality of RF channels at time intervals and transmitted.

The PLP structure is configured of an input mode A for providing one PLP and an input mode B for providing a plurality of PLPs. In particular, in response to the input mode B being supported, a robust specific service may be provided as well as one stream is distributed and transmitted, and thus, a time interleaving length may be increased and a time diversity gain may be obtained. Further, in response to only a specific stream being received, the receiving apparatus may be powered off for a remaining time for other streams, and may be used with low power, and thus, it may be suitable for services for portable or mobile broadcasting devices.

The time diversity is used to suppress deterioration of transmission quality in a mobile communication transmission line where a channel environment is changed according to a time. In response to a plurality of PLPs being transmitted from a transmission side, by transmitting each of the PLPs alternately at certain time intervals, not bursting PLP one by one, every PLP may acquire an average transmission quality.

That is, the frame generator 110 maps data to be transmitted with at least one signal processing path to generate a frame, and performs signal processing with respect to each path. For example, the signal processing may include at least one process among input signal synchronization, delay compensation, null packet deletion, cyclic redundancy check (CRC) encoding, header insertion, coding, interleaving, and modulation. The frames signal-processed with respect to the paths are generated as one transmission frame together with signaling information, and the generated transmission frame is transmitted to a receiving apparatus (not illustrated).

The preamble symbol inserter 120 may insert preamble symbols in each of the plurality of frames. Here, each of the preamble symbols may include location information about frames where an identical kind of data is inserted.

Signaling information related to the location information about frames where an identical kind of data is inserted may be included in the preamble symbols. Here, the signaling information may be Layer 1 (L1) signaling signal which transmits an L1 signal for a frame motive, and divided into pre-signaling and post-signaling. The post-signaling may include configurable post-signaling and dynamic post-signaling. A signaling region may be added to a starting part of a frame, and a transmission frame may be generated. As an example, a unit of a transmission frame where a P1 symbol and a signaling region are added to a frame in the DVB-T2 system is called a T2 frame.

A P1 symbol and a P2 symbol are terms used in an example of the DVB-T2. The P1 symbol is a symbol indicating a start of a frame, and the P2 symbol is a symbol including a signaling region. According to another exemplary embodiment, a start of a frame may be indicated by using a preamble symbol including a signaling region.

As an example, according to an exemplary embodiment, location information about frames where an identical kind of data is inserted may be included in pre-signaling or post-signaling of the P2 symbol.

The transmitter 130 may transmit a plurality of frames where preamble symbols are inserted.

Figure 2:
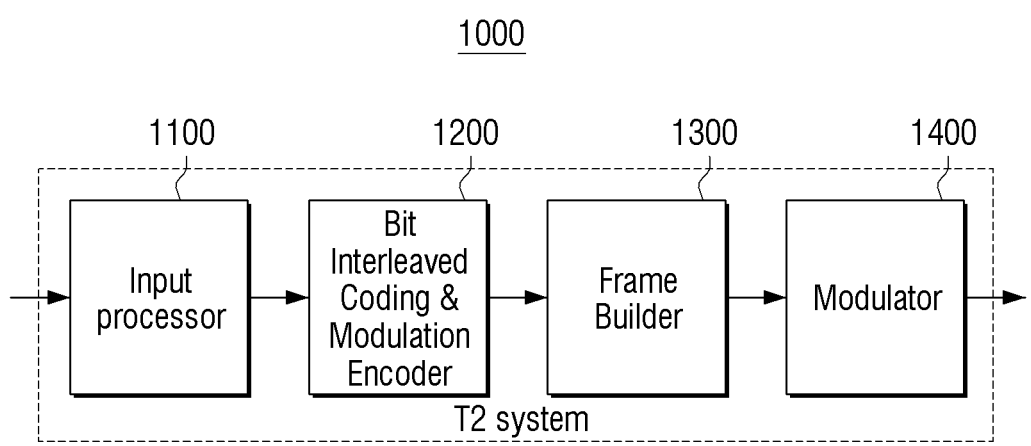
FIG. 2 is a block diagram illustrating a configuration of DVB-T2 which is a base of the inventive concept.

FIG. 2 is a block diagram illustrating a configuration of DVB-T2 which is a base of the inventive concept.

According to FIG. 2, a DVB-T2 transmission system 1000 may include an input processor 1100, a bit interleaved and coded modulation (BICM) encoder 1200, a frame builder 1300, and a modulator 1400.

The configuration of the DVB-T2 transmission system 1000 will be schematically described in that the configuration is the same as the contents defined in DVB-T2 which is one of European digital broadcasting standards. Detailed contents may be found in the "Digital Video Broadcasting (DVB); Frame structure channel coding and modulation for a second generation digital terrestrial television broadcasting system (DVB-T2)".

The input processor 1100 generates a baseband frame (BBFRAME) from an input stream regarding data to be serviced. Here, the input stream may be an MPEG-2 transport stream (TS or TS stream), a generic stream (GS or GS stream), or the like.

The BICM encoder 1200 performs encoding by determining a forward error coding (FEC) coding rate and a constellation order according to a region where data to be serviced is transmitted (a fixed PHY frame or a mobile PHY frame). Signaling information about the data to be serviced may be encoded through a separate BICM encoder (not illustrated) or may be encoded by sharing the BICM encoder 1200 with the data to be serviced according to different embodiments.

The frame builder 1300 and the modulator 1400 determine an OFDM parameter for a signaling region and an OFDM parameter for the region where the data to be serviced is transmitted, constitute a frame, add a sync region to the constituted frame, and generate the frame. Next, a modulation for modulating the generated frame to an RF signal is performed, and the RF signal is transmitted to a receiver.

Generating a frame illustrated in FIG. 1 may be performed in the input processor 1100, inserting an identical kind of data may be performed in the frame builder, and inserting a preamble symbol may be performed in the modulator 1400.

Figure 3:
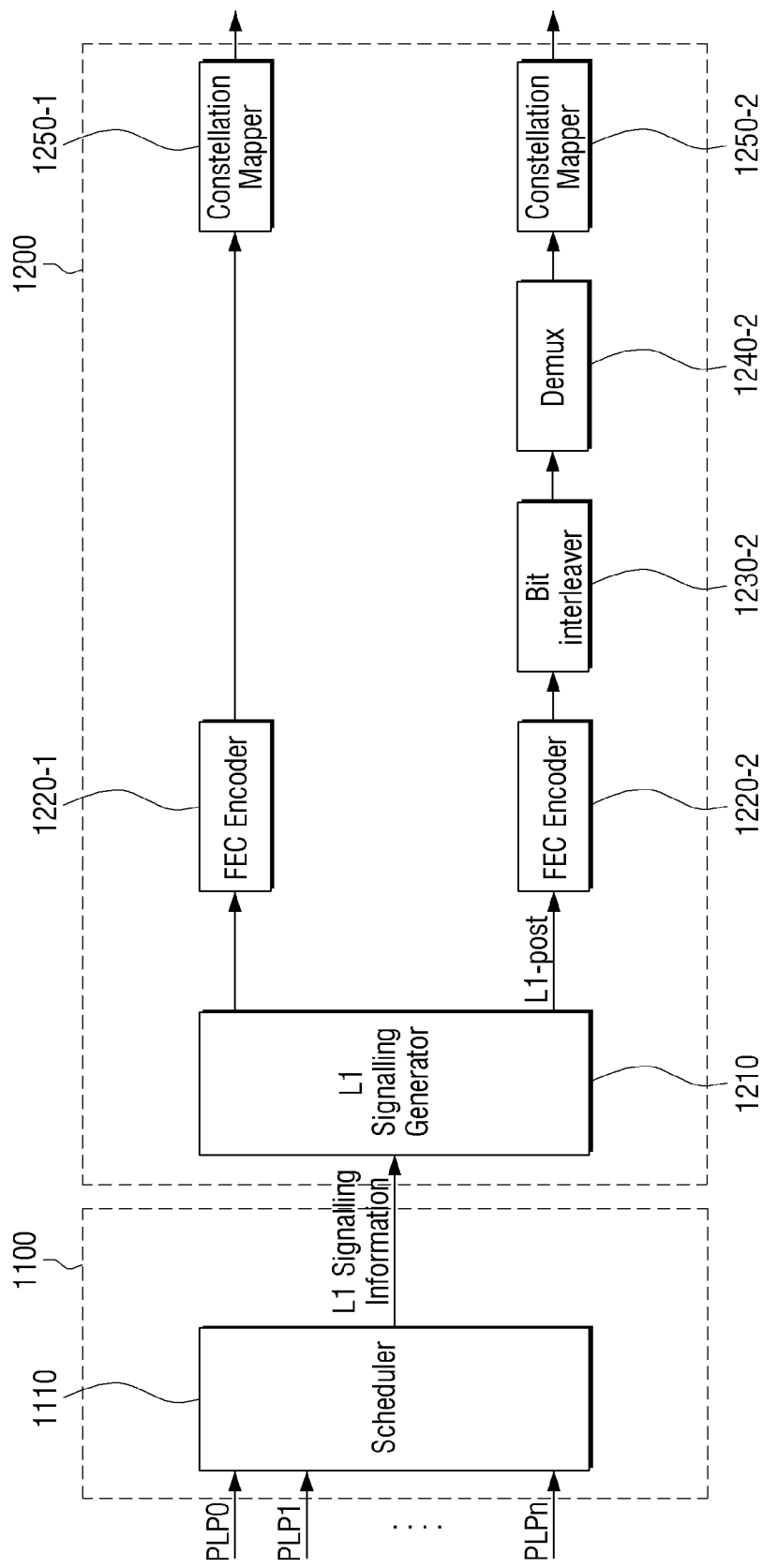
FIG. 3 is a block diagram illustrating a configuration of generating signaling information, according to an exemplary embodiment.

FIG. 3 is a block diagram illustrating a configuration of generating signaling information, according to an exemplary embodiment.

Referring to FIG. 3, the input processor 1100 and the BICM encoder 1200 are illustrated. The input processor 1100 may include a scheduler 1110. The BICM encoder 1200 may include an L1 signaling generator 1210, FEC encoders 1220-1 and 1220-2, a bit interleaver 1230-2, a demultiplexer 1240-2, and constellation mappers 1250-1 and 1250-2. The BICM encoder 1200 may further include a time interleaver (not illustrated). The L1 signaling generator 1210 may be included in the input processor 1100.

Each of the N numbers of service data is mapped onto PLP0 to PLPn. The scheduler 1110 determines locations, modulations, and code rates of a plurality of PLPs to map the PLPs with physical layers of T2. That is, the scheduler 1110 generates L1 signaling. In some cases, the scheduler 1110 may output dynamic information of L1 post-signaling of a current frame to the frame builder 1300. The scheduler 1110 may transmit the L1 signaling to the BICM encoder 1200. The L1 signaling includes L1 pre-signaling and the L1 post-signaling.

The L1 signaling generator 1210 classifies and outputs the L1 pre-signaling and the L1 post-signaling. The FEC encoders 1220-1 and 1220-2 perform FEC encoding including shortening and puncturing with respect to the L1 pre-signaling and L1 post-signaling, respectively. The bit interleaver 1230-2 performs interleaving with respect to the encoded L1-post signaling in bit units. The demultiplexer 1240-2 controls orders of bits constituting a cell to control bit robustness, and outputs the cell including the bits. Two constellation mappers 1250-1 and 1250-2 map the L1-pre signaling and the L1-post signaling onto a constellation, respectively. The L1 pre-signaling and the L1 post-signaling processed through the above-described process are outputted to the frame builder 1230. Thus, the L1 pre-signaling and the L1 post-signaling may be inserted into a frame.

Figure 4A:
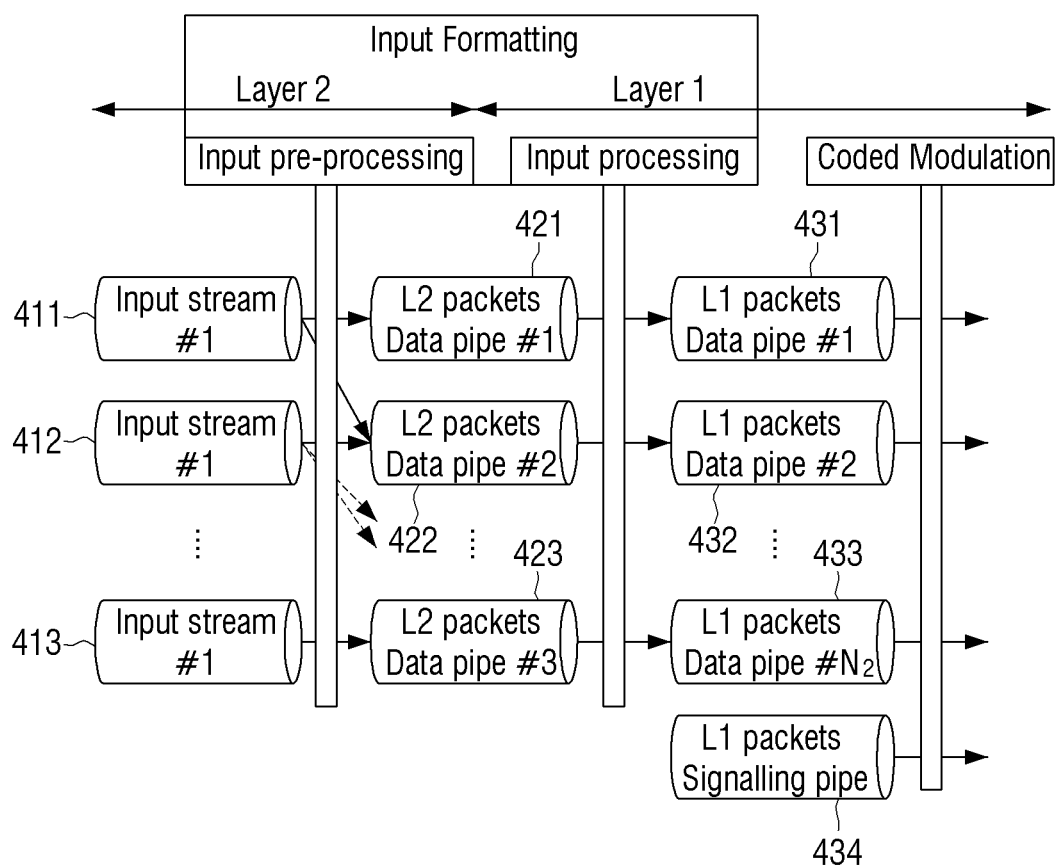
FIGS. 4A to 4C are views illustrating a unit structure of a transmission frame, according to an exemplary embodiment.
Figure 4B:
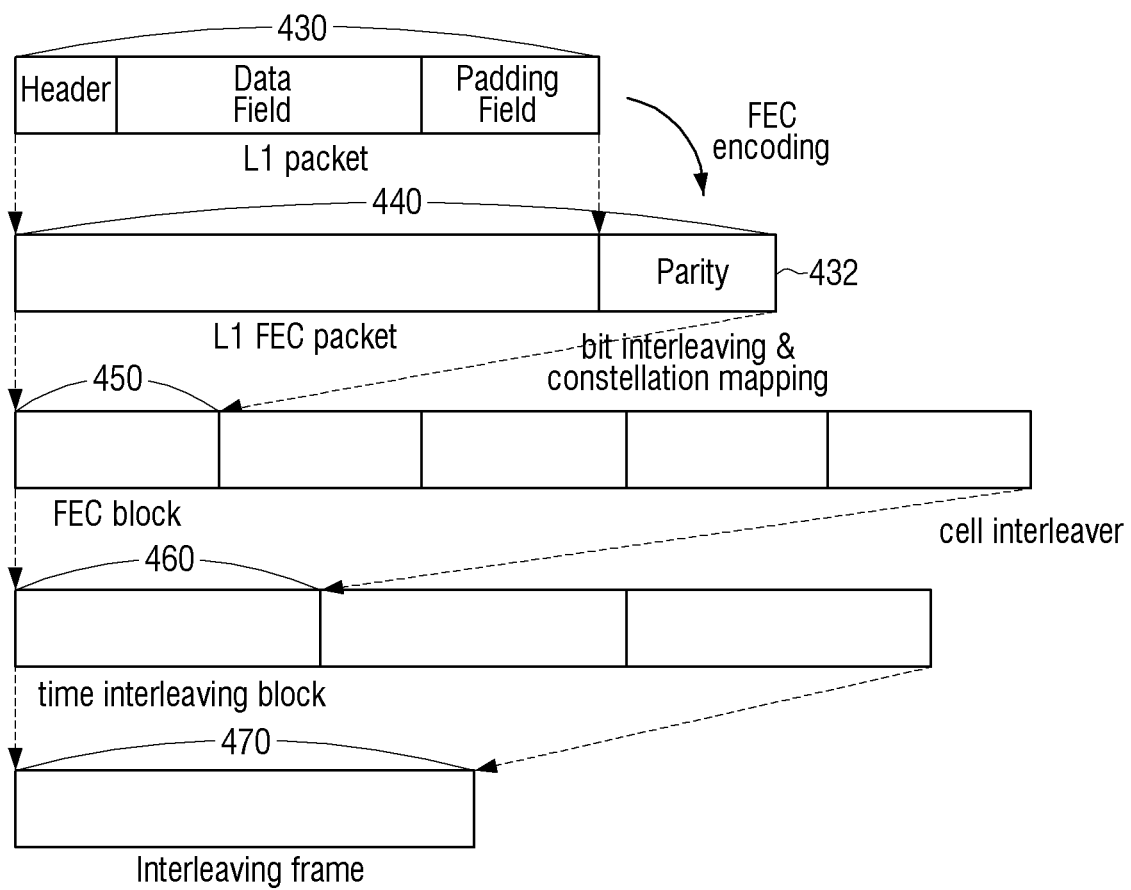
Figure 4C:
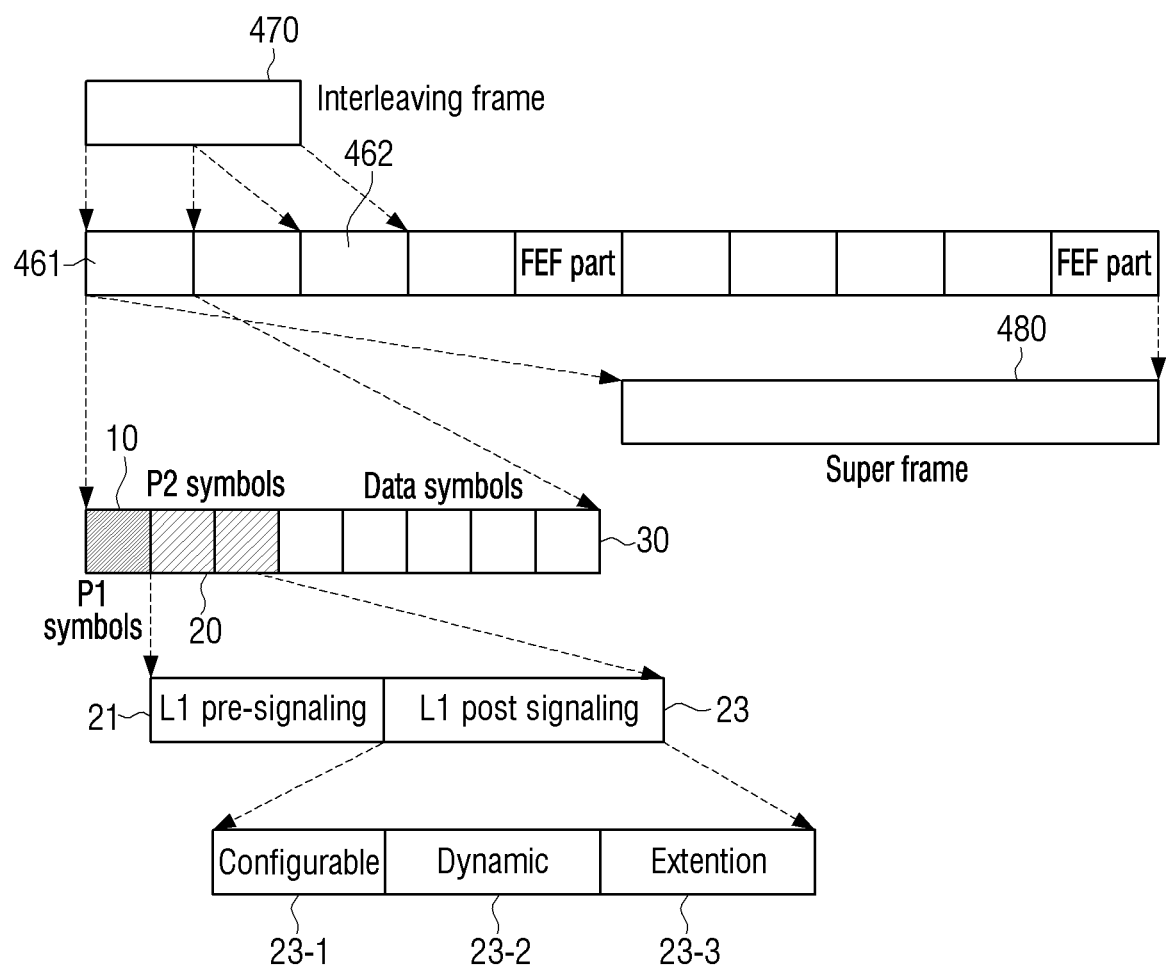

FIGS. 4A to 4C are views illustrating a unit structure of a transmission frame, according to an exemplary embodiment.

As illustrated in FIG. 4A, an input processing module configured to process an input stream to an L1 packet may be operated in a data pipe level.

FIG. 4A illustrates a process of processing the input stream to the L1 packet. A plurality of input streams 411 to 413 are processed to data pipes 421 to 423 for a plurality of L2 packets through an input pre-processing process. The data pipes 421 to 423 for the plurality of L2 packets are encapsulated in data pipes 431 to 433 for a plurality of L1 packets through an input processing process, and scheduled for a transmission frame (see 1110 of FIG. 3). Here, the L2 packet may include two types, for example, a fixed stream such as a TS stream and a variable stream such as a GS stream or a GS encapsulation (GSE).

FIG. 4B is a view illustrating a local frame structure with respect to each PLP.

As illustrated in FIG. 4B, an L1 packet 430 includes a header, a data field, and a padding field.

A parity 432 is added to the L1 packet 430 through an FEC encoding process and is processed to an L1 FEC packet 440.

The L1 FEC packet 440 is processed to a FEC block 450 through a bit interleaving and constellation mapping process, a plurality of FEC blocks are processed to a time interleaving block 460, and a plurality of time interleaving blocks constitute an interleaving frame 470.

FIG. 4C is a view illustrating a structure of an interleaving frame.

Referring to FIG. 4C, the interleaving frame 470 may be transmitted through different transmission frames 461 and 462, and a plurality of transmission frames may constitute one superframe 480.

A single transmission frame 461 may include a P1 symbol 10 indicating a start of the transmission frame, a P2 symbol 20 which transmits an L1 signal, and at least one data symbol 30 which transmits data.

The P1 symbol 10 may be located at a first portion of the transmission frame 461, and may be used to detect a starting point of the transmission frame, i.e., a T2 frame. For example, the P1 symbol 10 may transmit seven-bit information.

The P2 symbol 20 is located next to the P1 symbol 10 of the T2 frame.

The P2 symbol 20 includes an L1 pre-signaling 21 and an L1 post-signaling 23. The L1 pre-signaling 21 provides a basic transmission parameter including parameters required to receive and decode the L1 post-signaling.

The L1 post-signaling 23 includes a configurable post-signaling 23-1 and a dynamic post-signaling 23-2. The L1 post-signaling 23 may optionally include an extension field 23-3. Although not illustrated in FIG. 6, the L1 post-signaling 23 may further include a CRC field. If necessary, the L1 post-signaling may further include an L1 padding field.

Figure 5:
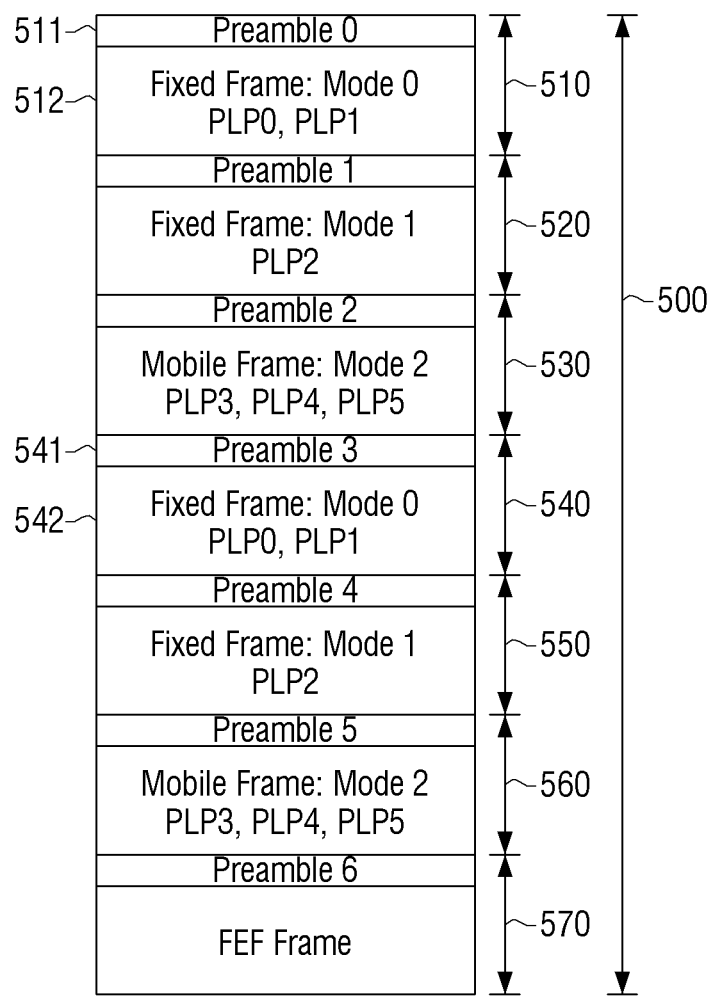
FIG. 5 is a view illustrating a configuration of a frame, according to an exemplary embodiment.

FIG. 5 illustrates a configuration of a frame, according to an exemplary embodiment. Here, the frame may refer to a transmission frame or T2 frame.

Referring to FIG. 5, frames 510, 520, 530, 540, 550, 560 and 560 constitute one super frame 500.

As illustrated in FIG. 5, the superframe 500 may include the plurality of frames 510, 520, 530, 540, 550, 560 and 570 and each of the plurality of frames 510, 520, 530, 540, 550, 560 and 570 may include various kinds of data. For example, the first frame 510 includes PLP0 and PLP1, the second frame 520 includes PLP2, and the third frame 530 includes PLP3, PLP4 and PLP5.

The seventh frame 570 includes a future extension frame (FEF) in a data region, and this is a frame which is remained for a later use. In a case where the FEF frame is included, a preamble symbol is included as in the other frames 510, 520, 530, 540, 550 and 560.

A data region of each frame includes information about a mode, and the mode indicates kinds of data included in the data region. That is, frames which include a same kind of data have a same mode number.

According to FIG. 5, a data region of the first frame 510 includes PLP0 and PLP1, and a data region of the fourth frame 540 also includes PLP0 and PLP1, and thus, the first and fourth frames 510, 540 include a same kind of data and have same mode information. Here, it is indicated as Mode 0.

Also, a data region of the second frame 520 includes PLP2, and a data region of the fifth frame 550 also includes PLP2, and thus, these two frames include a same kind of data and have same mode information. Here, it is indicated as Mode 2 according to FIG. 5.

One or more kind of data inserted in a plurality of frames may be at least one of a first kind of data for a fixed terminal and a second kind of data for a mobile terminal.

For example, as illustrated in FIG. 5, the superframe 500 may include a frame including the first kind of data for a fixed terminal or a frame including the second kind of data for a mobile frame. Here, PLP0 and PLP2 indicated as Mode 1 and included in the first frame 510 corresponds to the first kind of data for a fixed terminal, and PLP3, PLP4 and PLP5 indicated as Mode 2 and included in the third frame 530 corresponds to the second kind of data for a mobile terminal.

In other words, the first frame 510 includes data which supports a fixed terminal, and is a frame to be used for a fixed terminal, and the third frame 530 includes data which supports a mobile terminal, and is a frame to be used for a mobile terminal.

Various kinds of data which support a fixed terminal may exist. For example, data which support a fixed terminal may be classified according to an area, a channel environment, whether an alert message is included or the like. Also, data which supports a mobile terminal may be classified according to various conditions.

The second frame 520 includes PLP2 which supports a fixed terminal, and is indicated as Mode 1, but this is different from PLP0 and PLP2 included in the first frame 510. The first and second frame 510, 520 both are frames for supporting a fixed terminal, but are different from each other according to an area, a channel environment or the like.

Various kinds of data inserted in a plurality of frames are classified into data for a fixed terminal and data for a mobile terminal, but this is one of examples, and may be classified according to contents, users of the contents or the like in addition to a type of a supported terminal.

Each preamble symbol inserted in each of a plurality of frames may include location information about a frame where an identical kind of data is included. The location information included in a preamble symbol of a frame may indicate the number of frames and/or information about a length of frames which exist between the frame including the preamble symbol and a frame separated by the shortest distance from the frame among a plurality of subsequent frames which include the same kind of data as data included in the former frame.

The transmitting apparatus 100 may transmit information about when a frame including a same kind of data as data included in a currently received frame is received, along with the data, to a receiving apparatus (not illustrated). If the transmitting apparatus 100 does not transmit this information to the receiving apparatus, the receiving apparatus should decode all preamble symbols of frames to check whether the same kind of data is included, and thus, it is disadvantageous in terms of power consumption and a processing speed.

Thus, according to an exemplary embodiment, a preamble symbol may include location information regarding where a frame including a same kind of data, i.e., a same mode, is located.

As described above, the location information indicates the number of frames which exist between a frame, which includes the location information, and a frame separated by the shortest distance among a plurality of subsequent frames which include the same kind of data, and/or a length between these two frames. Here, the number of frames is information required to inform how many frames should be passed until when a frame including the same kind of data is received, and the length between these two frames is information required to inform the length from an end of a current frame to a start point of a frame including the same kind of data based on a standard interval (elementary period T).

Referring to FIG. 5, the data regions 512 and 542 of the first frame 510 and the fourth frame 540 include PLP0 and PLP2 which indicate the same kind of data. Accordingly, the fourth frame 540 may be one of subsequent frames which include the same kind of data as data included in the first frame 510.

Frames 520 and 530 subsequently to the first frame 510 do not include PLP0 and PLP2 which are the same kind of data as data included in the first frame 510, and thus, the fourth frame 540 is the first frame among the subsequent frames which include the same kind of data as the data included in the first frame 510.

Accordingly, the fourth frame 540 is a frame separated from the first frame 510 by the shortest distance among the subsequent frames which include the same kind of data as the first frame 510.

The number of frames exist between the first frame 510 and the fourth frame 540 is two (2).

Also, as an example, a sample on DVD-T2 is 64/7 MHz, and a time of one sample is 7/64 µs, and accordingly, a standard interval (elementary period T) on the DVD-T2 may be 7/64 µs.

A length from the end of the first frame 510 to the start of the fourth frame 540 may be expressed by a multiple of 7/64 µs described above. For example, if the second frame 520 and the third frame 530 correspond to 1,000 samples, respectively, 7/64 µs×2000 indicates the length from the end of the first frame 510 to the start of the fourth frame 540.

A preamble symbol 511 inserted in the first frame 510 may include information indicating that the number of frames which exist between the corresponding frame 510 and the fourth frame 540 is two (2), and the length from the end of the corresponding frame 510 to the start of the fourth frame 540 is 7/64 µs×2000.

To be specific, the preamble symbol 511 (Preamble 0) inserted in the first frame 510 may include location information that Next_Frame_Interval indicating the number of frames existing between the first frame 510 and the fourth frame 540 which is separated from the first frame 510 by the shortest distance among a plurality of subsequent frames which include the same kind of data as the data included in the first frame 510 is two (2), and Next_Frame_Length indicating the length from the end of the first frame 510 to the start of the fourth frame 540 is 7/64 µs×2000.

Accordingly, the receiving apparatus may recognize that the fourth frame 540 which include the same kind of data as the first frame 510 is located on a frame which comes two frames after receiving the first frame 510, and the length from the first frame 510 to the fourth frame 540 is 7/64 µs×2000.

In FIG. 5, seven frames 510, 520, 530, 540, 550, 560 and 570 are illustrated only. However, for example, if a frame including a same kind of data (PLP0 and PLP1 which indicate Mode 0) among subsequent frames after the fourth frame 540 is located as the eighth frame, a preamble symbol 540 (Preamble 3) inserted in the fourth frame 540 may include location information that Next_Frame_Interval indicating the number of frames existing between the fourth frame 540 and the eight frame (not illustrated) which is separated from the fourth frame 540 by the shortest distance among the plurality of subsequent frames which include the same kind of data is three (3). If the fifth frame 550, the sixth frame 560 and the seventh frame 570 correspond to 100 samples, respectively, 7/64 µs×3000 indicates the length from the end of the fourth frame 540 to the start of the eighth frame. Further, the location information included in the preamble symbol 540 may include information that Next_Frame_Length indicating the length from the end of the fourth frame 540 to the start of the eighth frame is 7/64 µs×3000.

The second frame 520 may include PLP2 of Mode 1, and a frame separated from the second frame 520 by the shortest distance among a plurality of subsequent frames which include the same kind of data is the fifth frame 550. Accordingly, a preamble symbol (Preamble 1) inserted in the second frame 520 may include location information that Next_Frame_Interval indicating the number of frames existing between the second frame 520 and the fifth frame 550 is two (2), and Next_Frame_Length indicating the length from the end of the second frame 520 to the start of the fifth frame 550 is 7/64 µs×2000.

Preamble symbols inserted in the other frames may also include corresponding location information as illustrated above.

Figure 6:
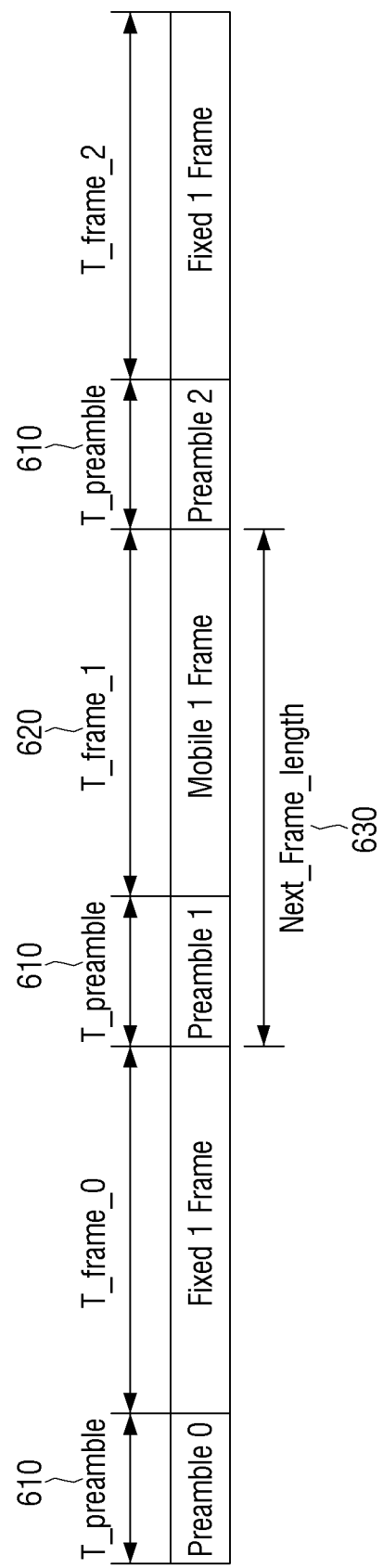
FIG. 6 is a view illustrating a method of indicating location information, according to an exemplary embodiment.

FIG. 6 is a view illustrating a method of indicating location information, according to an exemplary embodiment.

Referring to FIG. 6, three (3) frames are illustrated, and a preamble symbol is inserted in each of the frames. The first frame is a Fixed 1 Frame which includes data supporting a fixed terminal, the second frame is a Mobile 1 Frame which includes data supporting a mobile terminal, and the third frame is a Fixed 1 Frame which includes data supporting a fixed terminal.

Preamble 0 which is inserted in the first frame may include location information that Next_Frame_Interval indicating the number of frames existing between the first frame and the third frame separated from the first frame by the shortest distance among a plurality of subsequent frames which include data for a fixed terminal which is a same kind of data is one (1), and Next_Frame_Length 630 indicating the length from the end of the first frame to the start of the third frame is 7/64 µs×1000 assuming the second frame corresponds to 1,000 samples.

Here, all frames include a preamble symbol, and thus, to reduce the number of bits to store Next_Frame_Length 630, Next_Frame_Length 630 may indicate the length of a data region T_frame_1 620 which does not include the length of a preamble symbol T_preamble 610 in Next_Frame_Length 630.

Accordingly, the receiving apparatus may compensate the length of the real preamble symbol for a value of Next_Frame_Length 630, and calculate the real length between the first frame and the third frame.

As another example to reduce the number of bits to store Next_Frame_Length, a length of all frames may be defined by a common measure (M), and Next_Frame_Length may be expressed as an integer multiple of M. To be specific, Next_Frame_Length may be expressed as Next_Frame Length'×M.

FIG. 7 is a view illustrating a field included in L1 pre-signaling, according to an exemplary embodiment.

FIG. 8 is a view illustrating a field included in L1 post-signaling and indicating a kind of data, according to an exemplary embodiment.

A preamble symbol may include Next_Frame_Interval and Next_Frame_Length which respectively indicate number information and length information about frames existing between a frame and another frame separated from the frame by the shortest distance among a plurality of subsequent frames which include a same kind of data. FIG. 8 is a view illustrating L1 pre-signaling of a preamble symbol where Next_Frame_Interval 710 and Next_Frame_Length 720 are inserted.

FIGS. 5 and 6 illustrate a standard interval (element period T) by using a time of one sample 7/64 µs used in the DVB-T2, but the standard interval (element period T) is not limited thereto, and may be defined differently.

The preamble symbol inserted in each of the plurality of frames may include an indicator field which indicates whether data inserted in a corresponding frame is for a fixed terminal or a mobile terminal.

Referring to FIG. 8, TARGET_DEVICE 810 which is an indicator field inserted in L1 pre-signaling to indicate whether data inserted in a corresponding frame is for a fixed terminal or a mobile terminal.

A preamble symbol may include a field which sets a target device directly, and may include a field which sets one of a fixed terminal and a mobile terminal so that only a set terminal can receive corresponding data, or sets both a fixed terminal and a mobile terminal so that both types of terminal can receive corresponding data simultaneously.

In FIGS. 7 to 8, L1 pre-signaling and L1 post-signaling are used, respectively, as examples, but inserting fields regarding location information TARGET_DEVICE 810, Next_Frame_Interval 820, and Next_Frame_Length 830 is not limited thereto.

Figure 9:
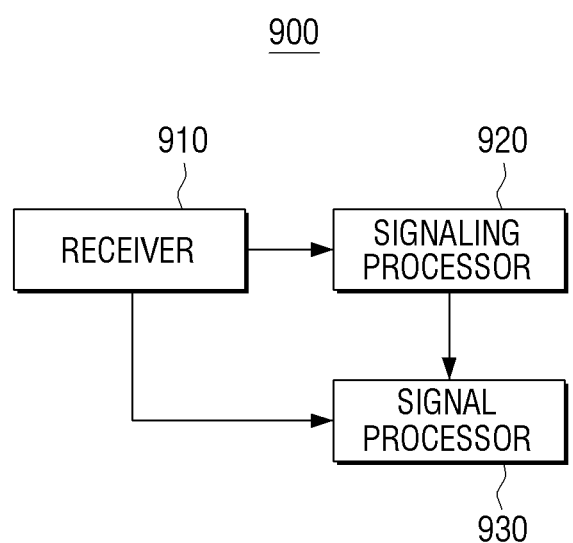
FIG. 9 is a block diagram illustrating a configuration of a receiving apparatus, according to an exemplary embodiment.

FIG. 9 is a block diagram illustrating a configuration of a receiving apparatus, according to an exemplary embodiment.

Referring to FIG. 9, a receiving apparatus 900 includes a receiver 910, a signaling processor 920 and a signal processor 930.

The receiver 910 may receive a plurality of frames in each of which a preamble symbol and data are inserted. Here, the frame may refer to a transmission frame.

The signaling processor 920 may detect signaling information for a received frame. Specifically, the signaling processor 920 may detect and decode L1 signaling and acquire the location information discussed above. For this, the signaling processor 920 may detect and decode a P2 symbol including L1 signaling.

The signaling processor 920 may detect location information about a frame, that is, information about in which frame among a plurality of frames a same kind of data is inserted, from a preamble symbol of a frame. Herein, the data may be such data that the receiving apparatus 900 is set to support or selects to receive.

The signal processor 930 may selectively process a frame where data a kind of which is the same as a predetermine kind of data, based on the detected location information. Here, the frame processing may include one or more of demodulation, frame de-building, BICM decoding, and input de-processing, not being limited thereto.

The signal processor 930 may detect PLPs, perform FEC decoding, and generate an L2 packet from an L1 packet where an error is corrected based on a value of information regarding a protocol version of a frame provided from the signaling processor 920, information regarding a type of a frame, and information regarding a method of inserting data.

Figure 10:
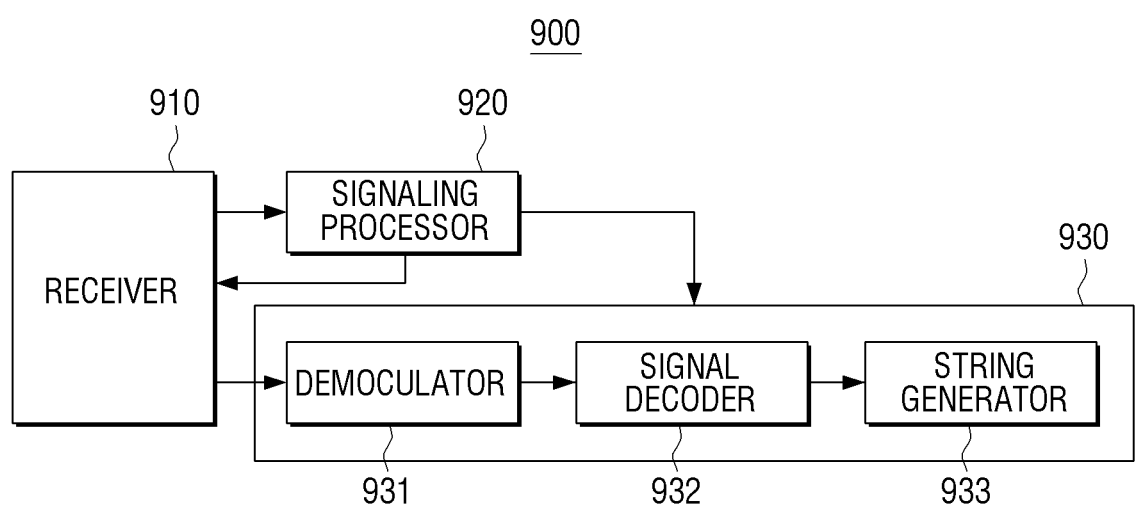
FIG. 10 is a block diagram illustrating a signal processor in detail, according to an exemplary embodiment.

FIG. 10 is a block diagram illustrating the signal processor 930, according to an exemplary embodiment.

Referring to FIG. 10, the signal processor 930 includes a demodulator 931, a decoder 932, and a stream generator 933.

The demodulator 931 may perform demodulating according to an OFDM parameter included in a received RF signal and perform a sync detection. If the sync is detected, the demodulator 931 may recognize whether a mobile frame, i.e., a frame supported by a mobile terminal, is received from information stored in a sync region, and whether a fixed frame, i.e., a frame supported by a terminal, is received.

In this case, if the OFDM parameter regarding a signaling region and a data region is not predetermined, the OFDM parameter regarding the signaling region and the data region which is stored in the sync region is acquired, and then the OFCM parameter regarding a signaling region and a data region right after the sync region is acquired for the demodulation.

The decoder 932 performs decoding with respect to input data. In this case, the decoder 932 may acquire a parameter, such as an FEC method regarding data stored in each of data regions, a modulation method or the like, using signaling information. Also, the decoder 932 may calculate a starting location of data based on data information included in configurable post-signaling and dynamic post-signaling. In other words, the decoder 932 may obtain information about which location of a frame a corresponding PLP is transmitted.

The stream generator 933 may process a BBFRAME input from the decoder 932 and generate data to be serviced.

The stream generator 933 may generate an L2 packet from an L1 packet, which an error is corrected, based on location information provided from the signaling processor 920.

The stream generator 933 may include de-jitter buffers, and the de-jitter buffers may regenerate an accurate timing to restore an output stream based on a value regarding location information about a frame provided from the signaling processor 920, or the like. Accordingly, a delay for a sync between a plurality of PLPs may be compensated.

The signaling information includes pre-signaling and post-signaling, and the post signaling includes the configurable post-signaling and the dynamic post-signaling.

As illustrated in FIG. 8, the post-signaling may include TARGET_DEVICE 810, Next_Frame_Interval 820, and Next_Frame_Length 830.

The signal processor 930 may selectively process frames which include the same kind of data based on the detected location information. Herein, the selective processing means that frame which include the same kind of data may be processed by the signal processor 930, and frames which include a different kind of data may not be processed by the signal processor 930, according to the detected location information.

As discussed above, the location information includes at least one of number information and length information of frames which exist between a frame and another frame separated from the frame by the shortest distance among a plurality of subsequent frames which include the same kind of data.

If the receiver 910 receives a plurality of frames in each of which a preamble symbol and data are inserted, the signal processor 930 may detect location information about a frame which include a same kind of data, and may selectively process frames which include the same kind of data based on the detected location information, but the inventive concept is not limited thereto. The signaling processor 920 may detect the location information, and provide the detected location information to the receiver 910 so that the receiver 910 may receive only frames which include the same kind of data and may not receive frames which include a different kind of data. Accordingly, the signal processor 930 may process only the frames including the same kind of data received through the receiver 910 is inserted.

In other words, according to whether a predetermined kind of data is inserted in a frame, or a different kind of data is inserted in a frame, the signal processor 930 may selectively process frames, or the receiver 910 may selectively process frames.

Figure 11:
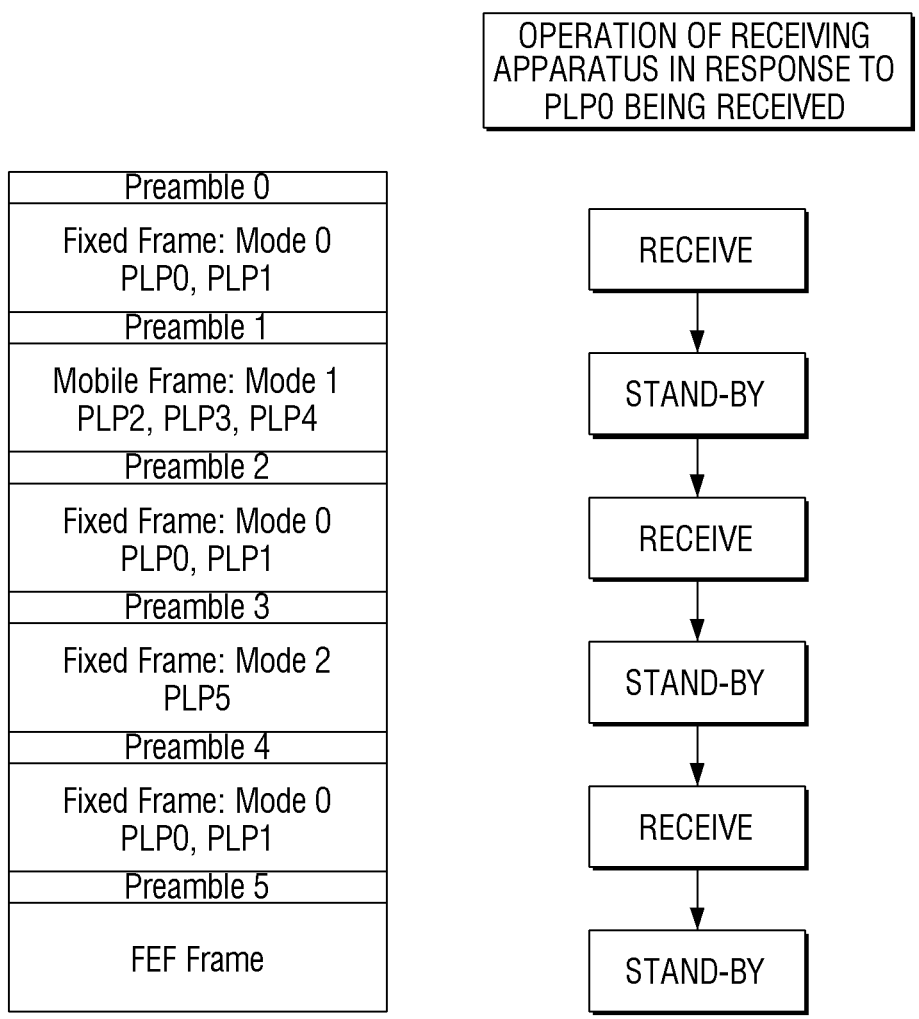
FIG. 11 is a view illustrating an operation of a receiving apparatus, according to an exemplary embodiment.

FIG. 11 is a view illustrating an operation of a receiving apparatus, according to an exemplary embodiment.

Referring to FIG. 11, the receiving apparatus 900 is set to receive PLP0, and a predetermined kind of data is set to PLP0.

Accordingly, the receiving apparatus 900 operates with respect to a first frame, a third frame, and a fifth frame where PLP0 is inserted among a plurality of frames, but the receiving apparatus 900 does not operate with respect to a second frame, a fourth frame, and a sixth frame where data different from the predetermined kind of data set to PLP0 is included, and thus, the receiving apparatus selectively process frames.

FIG. 11 illustrates a case where the receiving apparatus 900 receives frames which include a predetermined kind of data among a plurality of frames. However, as described above, even if the receiver 910 of the receiving apparatus 900 receives all of the plurality of frames, the signal processor 930 may selectively process frames which include only the predetermined kind of data among all of the received plurality of frames, based on location information.

Data inserted in a plurality of frames may include at least one of a first kind of data for a fixed terminal and a second kind of data for a mobile data. As an example, the predetermined kind of data is the first kind of data for a fixed terminal if the receiving apparatus 900 is a fixed terminal, and is the second kind of data for a mobile terminal if the receiving apparatus 900 is a mobile terminal.

A preamble symbol inserted in each of a plurality of frames may include an indicator field which indicates whether data inserted in a corresponding frame is for a fixed terminal or a mobile terminal.

The preamble symbol may include a field which sets a target device directly. Alternatively, the preamble symbol may include a field which sets only a fixed terminal, only a mobile terminal, or both a fixed terminal and a mobile terminal, as described above.

The signaling processor 920 may include at least one of number information and length information about frames which exist between a frame and another frame separated from the frame by the shortest distance among a plurality of subsequent frames where the same kind of data is inserted, as described above. Accordingly, the signal processor 930 may calculate a time corresponding to the shortest distance based on the at least one of the number information and the length information of frames.

To be specific, the signal processor 930 may calculate a time corresponding to the shortest distance using following Equation 1.

$$\text{Real distance}=\text{Next\_Frame\_Length}+\text{Next\_Frame\_Interval}\times T\_\text{preamble} \quad (1)$$

In other words, as illustrated in FIG. 6, all frames commonly include a preamble symbol, and thus, to reduce the number of bits to store Next_Frame_Length 630, Next_Frame_Length 630 may indicate only a length of a data region T_frame_1 620 which does not include the length of the preamble symbol T_preamble 610 in Next_Frame_Length 630. Accordingly, the signal processor 930 may be compensated by multiplying a length of a preamble symbol T_preamble 610 by the number of frames which exist between a frame and another frame separated from the frame by the shortest distance among a plurality of subsequent frames where a same kind of data is included, and adding the multiplied value and Next_Frame_Length 630 which is expressed as a length of a data region T_frame_1 620 where a length of a preamble symbol T_preamble 610 is not included. Thus, a real distance between the frame and the other frame separated from the frame by the shortest distance among a plurality of subsequent frames where the same kind of data is included.

The real distance may be expressed based on a standard interval (element period T). Accordingly, the signal processor 930 may calculate a real distance corresponding to the shortest distance as a time, and may determine when a frame which includes the same kind of data should be processed after a current frame.

As another example to reduce the number of bits to store Next_Frame_Length, a length of all frames may be defined by a common measure (M), and Next_Frame_Length may be expressed as an integer multiple of M. To be specific, Next_Frame_Length may be expressed as Next_Frame_Length'× M. In this case, the signal processor 930 may calculate a time corresponding to the shortest distance using following Equation 2.

$$\text{Real distance}=\text{Next\_Frame\_Length'}\times M+\text{Next\_Frame\_Interval}\times T\_\text{preamble} \quad (2)$$

The signal processor 930 may maintain a stand-by state during the calculated time, and operate in a normal state when frames of the shortest distance are processed after the calculated time elapses.

The signal processor 930 may maintain a stand-by state which does not perform processing on frames existing between a frame and another frame separated by the frame by the shortest distance among a plurality of subsequent frames where a same kind of data of a corresponding frame is included during the calculated time, and may operate in a normal state which performs processing on the other frame after the calculated time elapses.

Figure 12:
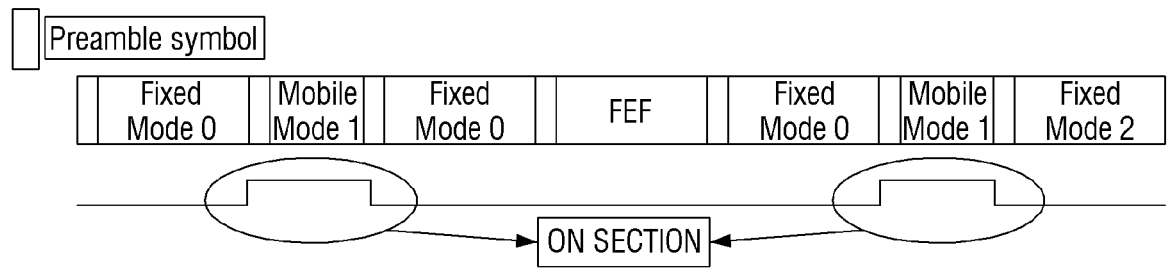
FIG. 12 is a view illustrating an operation of a receiving apparatus which supports a mobile terminal, according to an exemplary embodiment.

FIG. 12 is a view illustrating an operation of a receiving apparatus which supports a mobile terminal, according to an exemplary embodiment.

Referring to FIG. 12, the signal processor 930 of the receiving apparatus 900 may selectively process frames including data which supports a mobile terminal among a plurality of received frames.

To be specific, the receiver 910 may receive a plurality of frames including data which supports a fixed terminal or data which supports a mobile terminal. The signaling processor 920 may detect at least one of number information and length information about frames which exist between frames separated by the shortest distance among a plurality of subsequent frames which include data supporting a mobile terminal, from a preamble symbol inserted in a second frame.

In FIG. 12, Next_Frame_Interval which indicates the number of frames which exist between a frame and another frame separated by the shortest distance from the frame among the plurality of subsequent frames which include the data supporting a mobile terminal is three (3). If each of the frames which exist between these two frames corresponds to 1000 samples, Next_Frame_Length may include location information which is set to 7/64 μs×3000. Here, a time of one sample on DVB-T2 is used as described above.

As another example, if a length of a preamble symbol is not considered to reduce the number of bits of Next_Frame_Length, and the length of the preamble corresponds to 7/64 μs×100, Next_Frame_Length indicates length information of 7/64 μs×2700.

Accordingly, the signal processor 930 may process a frame the shortest distance away among a plurality of subsequent frames which include data supporting a mobile terminal after the time based on the calculated real distance elapses.

The signal processor 930 may not process a plurality of subsequent frames which do not include data supporting a mobile terminal during the time based on the calculated real distance.

The signal processor 930 may reduce power consumption by selectively processing frames where a same kind of data or a data which the receiving apparatus 900 selects to receive is included.

Figure 13:
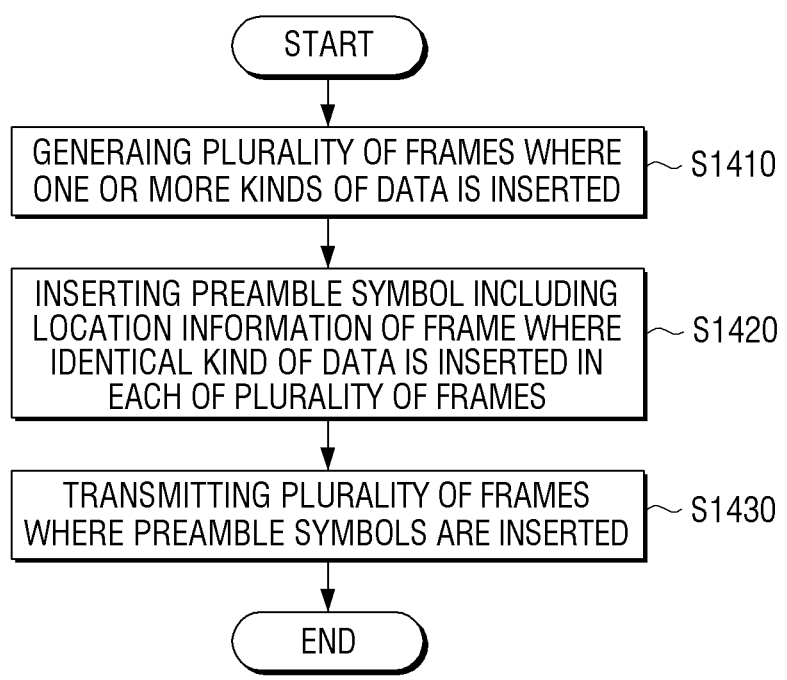
FIG. 13 is a flowchart illustrating a control method of a transmitting apparatus, according to an exemplary embodiment.

FIG. 13 is a flowchart illustrating a method of controlling a transmitting apparatus, according to an exemplary embodiment.

According to a method of controlling the transmitting apparatus illustrated in FIG. 13, first of all, a plurality of frames where one or more kinds of data are inserted may be generated (S1410).

In addition, a preamble symbol including location information about a frame where a same kind of data is inserted in each of the plurality of frames may be inserted (S1420).

Here, the location information may include at least one of number information and length information about frames which exist between a frame and another frame separated from the frame by the shortest distance among a plurality of subsequent frames where the same kind of data is included.

At least one or more kinds of data may include at least one of a first kind of data for a fixed terminal and a second kind of data for a mobile terminal.

A preamble symbols inserted in each of a plurality of frames may include an indicator field which indicates whether data inserted in a corresponding frame is for a fixed terminal or for a mobile terminal.

A plurality of frames where a preamble symbol is inserted may be transmitted (S1430).

Figure 14:
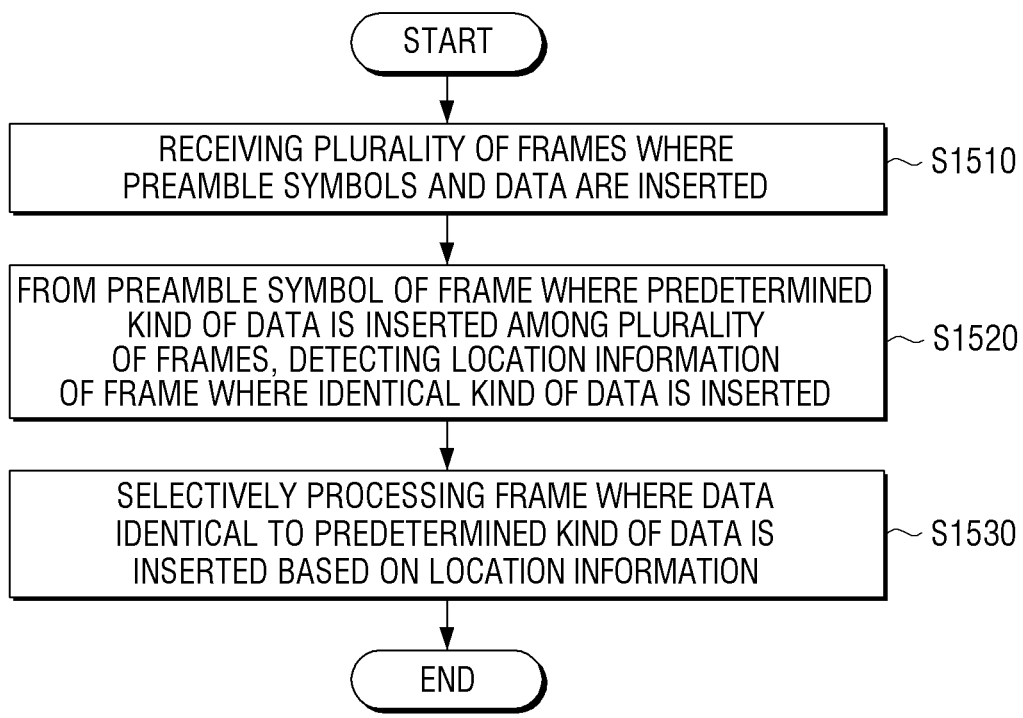
FIG. 14 is a flowchart illustrating a control method of a receiving apparatus, according to an exemplary embodiment.

FIG. 14 is a flowchart illustrating a method of controlling a receiving apparatus, according to an exemplary embodiment.

According to a method of controlling the receiving apparatus illustrated in FIG. 14, a plurality of frames where preamble symbols and data are inserted may be received (S1510).

From a preamble symbol of a frame where a predetermined kind of data is inserted among a plurality of frames, location information about a frame where a same kind of data is inserted may be detected (S1520).

Herein, the location information may include at least one of number information and length information of frames which exist between a frame and another frame separated from the frame by the shortest distance among a plurality of subsequent frames where the same kind of data is included.

Frames where the same predetermined kind of data are inserted may be selectively processed based on the location information (S1530).

Herein, the processing may calculate a time corresponding to the shortest distance based on at least one of the number information and the length information about frames.

The processing may maintain a stand-by state during the calculated time, and operate in a normal state when a frame separated by the shortest distance is processed after the calculated time is elapsed.

Data inserted in a plurality of frames may include at least one of a first kind of data for a fixed terminal and a second kind of data for a mobile data.

A preamble symbol inserted in each of the plurality of frames may include an indicator field which indicates whether data inserted in a corresponding frame is for a fixed terminal or a mobile terminal.

A non-transitory computer readable medium which stores a program performing a control method described above may be provided.

For example, each operation described in reference to FIGS. 13 and 14 may be provided by storing the operation in the non-transitory readable medium.

The non-transitory readable medium means a medium which stores a data semi-permanently and is readable by an apparatus, not a media which stores a data for a short period such as a register, a cache, a memory and so on. Specifically, a compact disk (CD), a digital versatile disk (DVD), a hard disk, a Blu-ray disk, a universal serial bus (USB), a memory card and read-only memory (ROM) may constitute the non-transitory readable medium.

At least one of the components, elements or units represented by a block as illustrated in FIGS. 1, 2, 3, 9 and 10 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a CPU that performs the respective functions, a microprocessor, or the like.

Although buses are not illustrated between the blocks illustrated in FIGS. 1, 2, 3, 9 and 10, communication therebetween may be performed through the buses.

Various exemplary embodiments corresponding to the inventive concept are illustrated and explained above, but the inventive concept is not limited to the described exemplary embodiments. Also, the description of the embodiments is intended to be illustrative, and not to limit the scope of the claims, and it would be appreciated by those skilled in the art that changes may be made to the embodiments without departing from the principles and spirit of the inventive concept, the scope of which is defined in the appended claims.

What is claimed is:

1. A transmitting apparatus, comprising:
   a frame generator configured to generate a plurality of frames which include one or more kinds of data;
   a preamble symbol inserter configured to insert at least one preamble symbol in each of the plurality of frames, and insert, in a preamble symbol of a frame, location information about at least one frame, among the plurality of frames, which includes a same kind of data as a kind of data included in the frame; and
   a transmitter configured to transmit the plurality of frames in each of which the preamble symbol is inserted,
   wherein the location information includes at least one of number information and length information about at least one frame which exists between the frame and another frame separated from the frame by the shortest distance among a plurality of subsequent frames, subsequent to the frame, in which the same kind of data is included, and
   wherein the same kind of data comprises a same PLP (Physical Layer Pipe).

2. The transmitting apparatus as claimed in claim 1, wherein the one or more kinds of the data comprises at least one of a first kind of data for a fixed terminal and a second kind of data for a mobile terminal.

3. The transmitting apparatus as claimed in claim 2, wherein the preamble symbol includes an indicator field which indicates whether the data included in the frame is for a fixed terminal or a mobile terminal.

4. A receiving apparatus, comprising:
   a receiver configured to receive a plurality of frames in each of which at least one preamble symbol is inserted and one or more kinds of data are included;
   a signaling processor configured to detect, from a preamble symbol of a frame, location information about at least one frame, among the plurality of frames, which includes a same kind of data as a kind of data included in the frame; and
   a signal processor configured to selectively process the frame and the at least one frame which includes the same kind of data, based on the location information, wherein the location information includes at least one of number information and length information about at least one frame which exists between the frame and another frame separated from the frame by the shortest distance among a plurality of subsequent frames, subsequent to the frame, in which the same kind of data is included, and wherein the same kind of data comprises a same PLP (Physical Layer Pipe).

5. The receiving apparatus as claimed in claim 4, wherein the signal processor calculates a time corresponding to the shortest distance based on the at least one of the number information and the length information.

6. The receiving apparatus as claimed in claim 5, wherein the signal processor maintains a stand-by state during the calculated time, and operates in a normal state when the other frame separated from the frame by the shortest distance is processed after the calculated time elapses.

7. The receiving apparatus as claimed in claim 4, wherein the one or more kinds of the data comprises at least one of a first kind of data for a fixed terminal and a second kind of data for a mobile terminal.

8. The receiving apparatus as claimed in claim 7, wherein a preamble symbol inserted in the other frame includes an indicator filter which indicates whether data included in the other frame is for a fixed terminal or a mobile terminal.

9. A controlling method of a transmitting apparatus, comprising:

generating a plurality of frames which include one or more kinds of data;

inserting at least one preamble symbol in each of the plurality of frames;

inserting, in a preamble symbol of a frame, location information about at least one frame, among the plurality of frames, which includes a same kind of data as a kind of data included in the frame; and transmitting the plurality of frames in each of which the preamble symbol is inserted, wherein the location information includes at least one of number information and length information about at least one frame which exists between the frame and another frame separated from the frame by the shortest distance among a plurality of subsequent frames, subsequent to the frame, in which the same kind of data is included, and wherein the same kind of data comprises a same PLP (Physical Layer Pipe).

10. The method as claimed in claim 9, wherein the one or more kinds of data comprises at least one of a first kind of data for a fixed terminal and a second kind of data for a mobile terminal.

11. The method as claimed in claim 10, wherein the preamble symbol includes an indicator field which indicates whether the data included in the frame is for a fixed terminal or a mobile terminal.

12. A controlling method of a receiving apparatus, comprising:

receiving a plurality of frames in each of which a preamble symbol is inserted and one or more kinds of data are included;

detecting, from a preamble symbol of a frame, location information about at least one frame, among the plurality of frames, which includes a same kind of data as a kind of data included in the frame; and selectively processing the frame and the at least one frame which includes the same kind of data, based on the location information, wherein the location information includes at least one of number information and length information about at least one frame which exists between the frame and another frame separated from the frame by the shortest distance among a plurality of subsequent frames, subsequent to the frame, in which the same kind of data is included, and wherein the same kind of data comprises a same PLP (Physical Layer Pipe).

13. The method as claimed in claim 12, wherein the selectively processing comprises calculating a time corresponding to the shortest distance based on the at least one of the number information and the length information.

14. The method as claimed in claim 13, wherein the selectively processing comprises maintaining the receiving apparatus in a stand-by state during the calculated time, and operating the receiving apparatus in a normal state when the other frame separated from the frame by the shortest distance is processed after the calculated time elapses.

15. The method as claimed in claim 12, wherein the one or more kinds of the data comprises at least one of a first kind of data for a fixed terminal and a second kind of data for a mobile terminal.

16. The method as claimed in claim 15, wherein a preamble symbol inserted in the other frame includes an indicator field which indicates whether data included in the other frame is for a fixed terminal or a mobile terminal.

* * * * *